Figure 1:
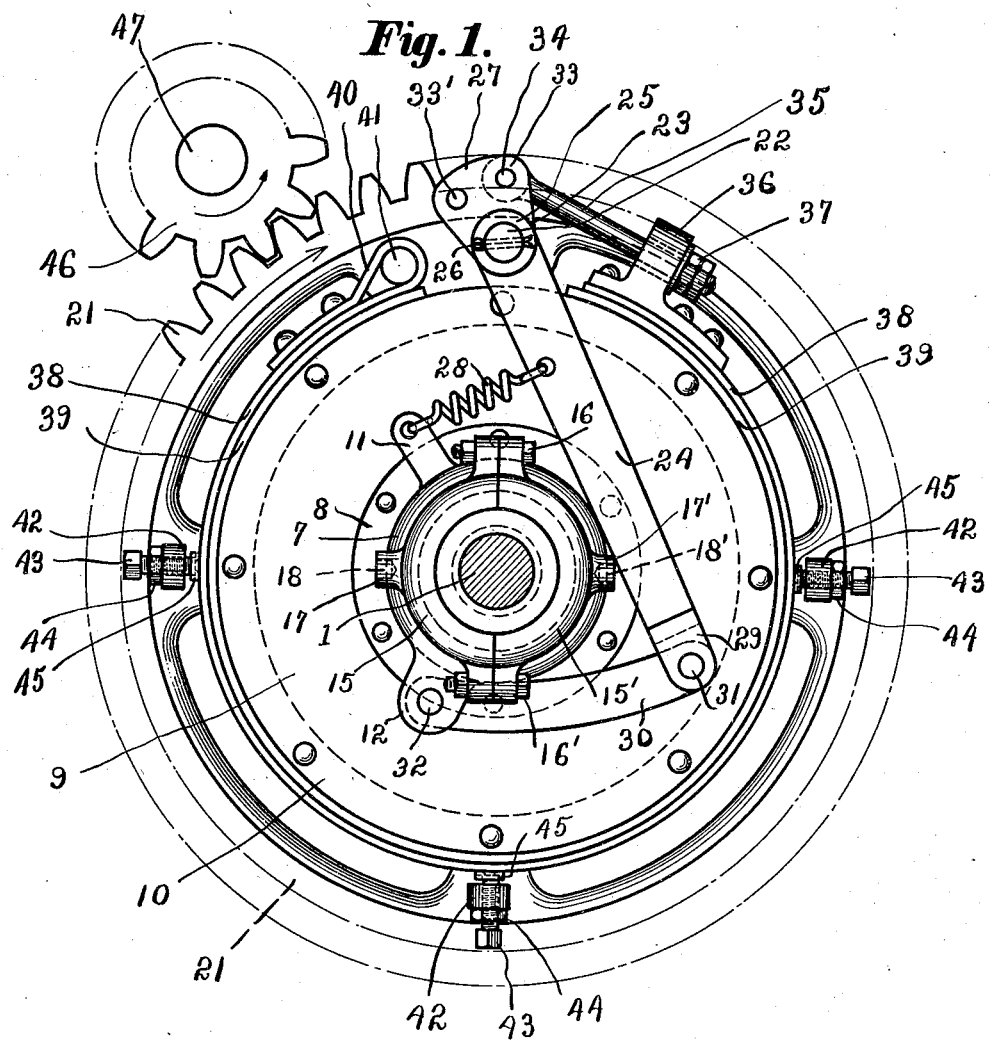

April 22, 1930.　　O. R. HUMPHREYS ET AL　　1,755,259

CLUTCH

Filed July 23, 1927　　2 Sheets-Sheet 1

Inventors
O.R.Humphreys
W.G.Humphreys
By Arthur H. Sturges,
Attorney

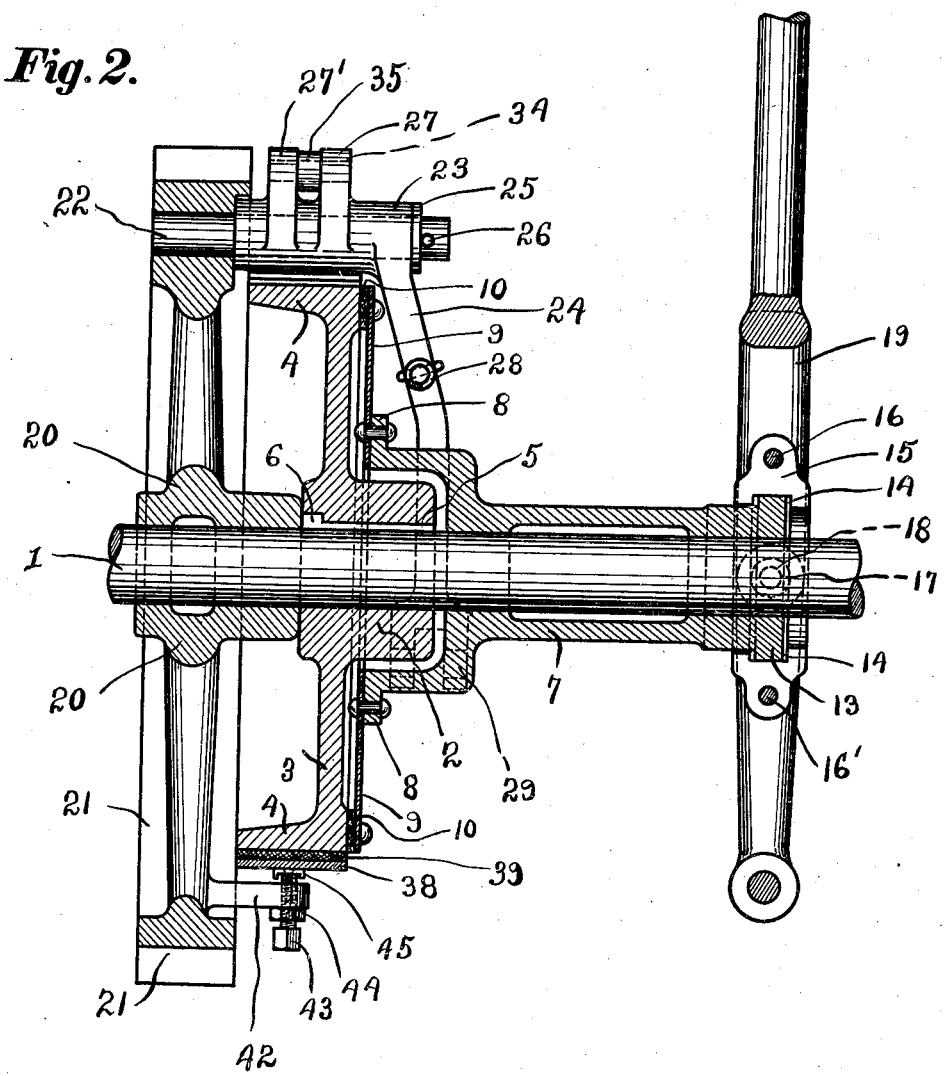

Patented Apr. 22, 1930

1,755,259

UNITED STATES PATENT OFFICE

OMAR R. HUMPHREYS AND WALTER G. HUMPHREYS, OF OMAHA, NEBRASKA

CLUTCH

Application filed July 23, 1927. Serial No. 207,930.

The present invention relates to clutches, and more particularly to clutches which may be used in hoisting devices or the like.

An object of the present invention is to provide a clutch of this type which will take hold gradually but positively.

Another object of this invention is to provide a device in which the locking mechanism will rotate therewith.

A further object of this invention is to provide a device which will readily respond to the action of the operator.

The above and various other objects and advantages of this invention will in part be described in and in part be understood from the following detailed description of the present preferred embodiment, the same being illustrated in the accompanying drawings, wherein:

Fig. 1 is a detailed end elevation of a clutch constructed according to the present invention, and Fig. 2 is a sectional view of the same taken substantially through the center thereof.

Referring to the drawings, and first to Fig. 2, the numeral 1 designates a shaft which may be connected to a driven member, and a disc wheel 3 having a hub 2 is mounted on the shaft 1. The disc 3 has a flange 4 extending inwardly therefrom, and the hub 2 is provided with a keyway 5 in which a key 6 is adapted to fit for holding the wheel 3 in close engagement on the shaft 1.

A slidable sleeve 7 is loosely mounted on the shaft 1 outwardly from the hub 2, and the inner end of the sleeve 7 is preferably adapted to partially telescope the outer end of the sleeve 2. The sleeve 7 is provided at its inner end with a flange 8 to which an annular disc 9 is securely fastened in any suitable manner. The brake disc 9 is provided with a ring brake lining 10 which is secured to the inner face of the disc 9 in any suitable manner. The sleeve 7 is provided adjacent the inner end thereof with a pair of arms 11 and 12, which are shown in detail on Fig. 1, and the purposes of these arms will be later described in detail.

Adjacent the outer end of the sleeve 7 an annular thrust ring 13 is adapted to seat in an annular slot 14 which is provided in the two-part block 15, 15' about the outer end of the sleeve 7. A forcer ring or block having complementary halves 15 and 15' are secured together by bolts 16 and 16' or the like. The forcer ring or block is adapted to engage the thrust ring 13 at the periphery thereof. The block 15—15' is further provided with a pair of opposite lugs 17 and 17', which have cavities or recesses 18 and 18' respectively for the reception of suitable fulcrum pins which may be mounted on a shift or release lever 19. The lever 19 may be pivoted at its lower end in any suitable manner, and the upper end of the lever is free to be moved either forwardly or rearwardly. The movement of the lever 19 will carry with it the ring 15—15' which will move the sleeve 7 in the desired direction.

A gear wheel 21 having a hub 20 is adapted to be loosely mounted on said shaft 1 and the outer end of the hub 20 abuts the inner end of the hub 2 on disc 3. A pin 22 is secured in the rim of the gear wheel 21 and extends outwardly therefrom, and a lever 24 having a head or bearing 23 is adapted to be pivotally mounted on said pin 22, said lever 24 being retained on said pin by a lock washer 25 and the lock washer 25 may be held in position by a cotter pin 26 or the like. A coil spring 28 is secured at one end to said lever 24 intermediate the ends thereof, and the opposite end of the coil spring 28 is secured in said arm 11 in any suitable manner. The lever 24 at its lower end has a fork 29 which is adapted to receive therein one end of a connecting link 30 which may be pivotally mounted in said fork 29 on a pin 31. The opposite end of the link 30 is pivotally secured to the arm 12 by a pin 32.

The head 23 of the lever 24 is provided with a pair of outstanding spaced lugs 27 and 27' which have therein apertures 33 and 33' for receiving therein a pin 34. A clutch band 38 having a friction lining 39 secured to the inner surface thereof in any suitable manner is provided with a bail 36. A draw bolt 35 is secured to said bail 36 by nuts 37 or the like, and the opposite end of the bolt 35 is pivotally mounted on said pin 34 between the spaced lugs 27 and 27'. The opposite open end of the clutch band 38 is provided with a loop 40, and a pin 41, which is securely fastened to the rim of the gear wheel 21, is adapted to hold said loop 40 in desired position.

A plurality of outstanding lugs 42 are mounted on said gear wheel 21. The lugs 42 are provided with adjusting screws 43 having lock nuts 44 and sliding plates 45. The lugs 42 provide support for the clutch band 38. The gear wheel 21 may be driven from any suitable source of power supply, and for this purpose a pinion 46 is provided which may be mounted on a shaft 47. It is of course understood that the size of the pinion may be varied to suit the particular case.

In operation the rotation of the pinion 46 in the direction indicated by the arrow will rotate the gear wheel 21 in the direction indicated by the arrow, and with the movement of the gear wheel 21 the lever 24, which is mounted on pin 22, and the sleeve 7 will rotate therewith. It is of course understood that the lever 24 is connected to said sleeve 7 through the connecting link 30, and the rotation of the lever 24 about the shaft 1 will carry with it the sleeve 7. With the sleeve 7 in motion the handle or lever 19 may be thrust forward thus bringing the brake lining 10 into contact or engagement with the disc 3. Owing to the lengths of the lever 24 and the link 30 there is sufficient lateral play in the connection between these members to admit of the relatively slight shifting of the sleeve 7, which movement amounts to little more than a pressure through the sleeve to the brake lining 10.

It will be understood that when the lever 19 is moved in a direction to cause the sleeve 7 to move toward the disc 3 and assuming that said disc is not rotating at this time, that the lining 10 will gradually engage the surface of the disc 3 in accordance with the amount of pressure applied by the operation of the lever 19. The friction created between the lining 10 and the disc 3 will cause the sleeve 7 to be retarded thereby causing the arm 24 to be moved outwardly away from the center of the device and causing the draw bolt 35 which is connected to the clutch band 38 to be moved in a manner to contract said clutch band upon the flange 4 of the disc 3, whereupon said disc will become locked with the sleeve 7 and coincidently with the gear or pulley wheel 21, these last mentioned parts being thereby caused to rotate in unison for transmitting power.

The movement of the sleeve 7 and the rotation of the lever 24 about the shaft 1 forces the connecting link 30 to push the lower end 29 of the lever outwardly, and this outward movement forces the draw bolt 35 to move forward thus contracting the clutch band 38 and the friction lining 39 will grip the drum or flange 4. When the lever 19 is moved backwardly the sleeve 7 will follow, carrying with it the disc 9 with its brake lining 10 which will move out of engagement with the disc 3. The coil spring 28 will then force the lever 24 to move backwardly thus expanding the clutch band 38 and releasing the drum 4.

It is of course understood that various changes and modifications may be made in the details of construction and design of the above specifically described embodiment of the invention without departing from the spirit thereof, such changes and modifications being restricted only by the scope of the following claim.

What is claimed is:

A clutch comprsing a shaft, a gear wheel loosely mounted on said shaft, a drum keyed to said shaft, a sleeve slidably mounted on said shaft, a disc mounted on the inner end of said sleeve and being adapted for engagement with the outer end of said drum when the sleeve is moved forwardly, an outstanding pin mounted in said gear wheel, a lever pivoted on said pin, a pair of outstanding arms on said slidable sleeve, a connecting link for connecting the outer end of said lever to one of said outstanding arms, a spring secured at one end of said lever intermediate the ends thereof and at the opposite end to the other of said outstanding arms, and clutch means surrounding said drum, means for connecting said clutch means and said lever, said spring being adapted to normally urge said lever inwardly whereby to expand said clutch means and release the same from the drum.

In testimony whereof, we have affixed our signatures.

OMAR R. HUMPHREYS.
WALTER G. HUMPHREYS.